United States Patent [19]

Tsuruta et al.

[11] 4,045,341
[45] Aug. 30, 1977

[54] METHOD FOR THE DISPOSAL OF WASTE WATER CONTAINING AMMONIUM IONS, SULFATE IONS AND ORGANIC SUBSTANCES

[75] Inventors: Hidemasa Tsuruta, Tokyo; Yoshiaki Kinoshita, Tachikawa; Isao Tanaka, Tokyo, all of Japan

[73] Assignee: Nittetu Chemical Engineering Ltd., Tokyo, Japan

[21] Appl. No.: 674,161

[22] Filed: Apr. 6, 1976

[30] Foreign Application Priority Data

Jan. 22, 1976    Japan .................................... 51-5485

[51] Int. Cl.² ............................................. C02B 1/20
[52] U.S. Cl. ........................................ 210/45; 210/48; 210/56
[58] Field of Search ............... 210/45, 48, 49, 56, 210/52, 51, 59, 42 R; 423/357, 356, 166, 541 A

[56] References Cited

U.S. PATENT DOCUMENTS

| 2,927,001 | 3/1960 | McCullough | 423/356 |
| 3,278,423 | 10/1966 | Millar | 423/377 |
| 3,359,069 | 12/1967 | Furkert et al. | 423/541 A |
| 3,761,575 | 9/1973 | Furkert | 423/356 |
| 3,935,100 | 1/1976 | Alagy et al. | 210/48 |

Primary Examiner—Wilbur L. Bascomb, Jr.
Assistant Examiner—Benoît Castel
Attorney, Agent, or Firm—Lane, Aitken, Dunner & Ziems

[57] ABSTRACT

Disclosed is a method whereby a waste water containing ammonium ions, sulfate ions and organic substances is subjected to combustive disposal subsequent to addition of calcium hydroxide or calcium oxide thereto.

5 Claims, 1 Drawing Figure

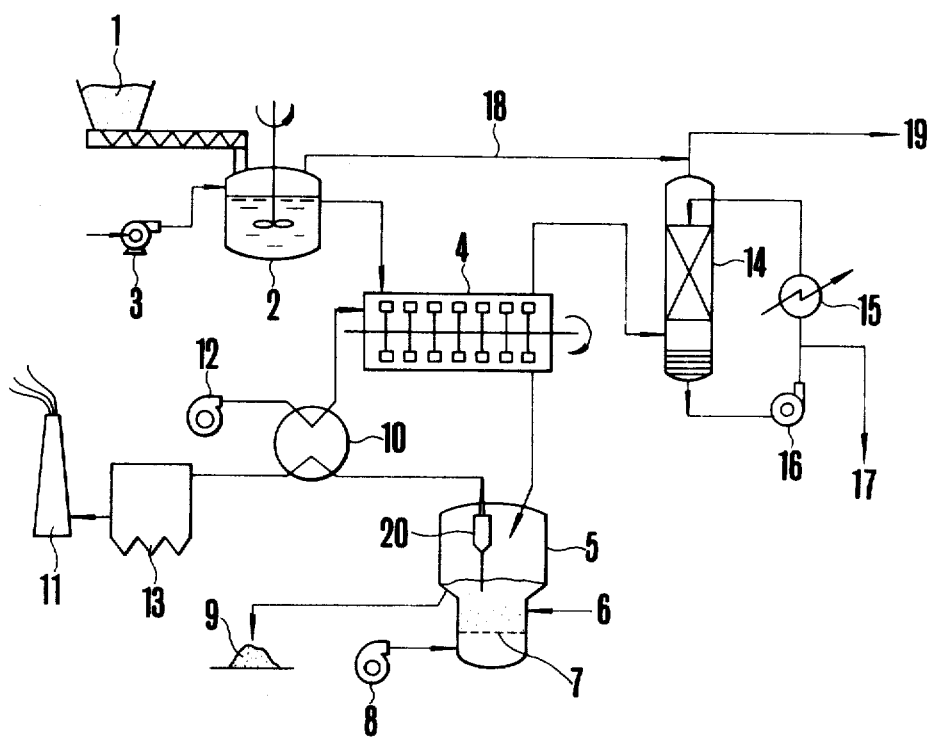

METHOD FOR THE DISPOSAL OF WASTE WATER CONTAINING AMMONIUM IONS, SULFATE IONS AND ORGANIC SUBSTANCES

FIELD OF THE INVENTION

This invention relates to a novel method for the disposal of a waste water containing ammonium ions, sulfate ions and organic substances.

BACKGROUND OF THE INVENTION

Several chemical processes are known to produce an effluent (waste water) containing ammonium ions ($NH_4^+$), sulfate ions ($SO_4^{--}$) and organic substances. A typical example is the process for the manufacture of acrylonitrile (hereinafter referred to an AN) by the ammoxidation or of methyl methacrylate ester (hereinafter referred to as MMA). In these processes, the amounts of their respective effluents are invariably large for the unit yields of their products. In these effluents, ammonium sulfate and organic substances are contained at high concentrations. In the effluent which is discharged during the manufacture of AN, there are contained ammonium ions, cyanide ions ($CN^-$), etc. in addition to the ammonium ions originating in ammonium sulfate. Release of this effluent in its unaltered form into a river or sea results in pollution. If this effluent is subjected in its unaltered form to combustive disposal and the resultant waste gas of combustion is released into the atmosphere, then the waste gas causes pollution of the atmospheric air.

Generally, the most reliable and simple method available for the disposal of any effluent containing organic substances in a high concentration is combustion. In the combustive disposal of the effluent supply of a large amount of auxiliary fuel is required where the effluent has no ample calorific value. In such a case, the effluent is deprived of as much of its water content as possible in advance such as by means of evaporation or desiccation and it is subsequently placed in a combustion furnace, so that it may be burned without use of the auxiliary fuel. Alternatively, it is necessary that the combustion of the effluent in its unaltered form be carried out by using such an auxiliary fuel in an irreducibly minimum amount. Where the effluent being delivered to the combustion furnace is in a form capable of being sprayed, the combustion is generally effected in a spray-type roasting furnace. A fluidized-bed type roaster is utilized where the effluent to be disposed is in the form of sludge, granule or powder, obtained by removing water from the effluent. Use of the fluidized bed type roaster also proves to be advantageous where the effluent to be disposed contains a large amount of water and other incombustible components and a low calorific value or it contains sparingly fusible inorganic substances. Substantially perfect combustion of organic substances is obtained by keeping the temperature of combustion generally above the level of 700° C, preferably above 800° C, and controlling the other conditions so that the gas discharged from the combustion of the effluent has a residual oxygen content of not less than 1.5%, preferably 3.0%, by volume, though all these conditions are variable to some extent with the type and size of the combustion furnaces adopted.

A pollution problem may possibly result, however, when the effluent containing ammonium ions, sulfate ions and organic substances is treated in its unaltered form by the aforementioned method of combustion and the resultant waste gas is released into the atmospheric air. Combustion of the effluent in its unaltered form results in conversion of the ammonium ions present in the effluent to ammonia. If the combustion in this case is effected at a temperature of not higher than 1000° C, then a part of this ammonia is oxidized as indicated by the reaction formula (1) given below. Nevertheless, a considerable amount of the ammonia remains intact in the waste gas of combustion. Part of the ammonia, upon exposure to oxygen, reacts as indicated by the reaction formula (2) below to produce nitrogen oxides (hereinafter referred to as $NO_x$) at a temperature of higher than 1000° C.

$$2NH_3 + 3/2\ O_2 \rightarrow N_2 + 3H_2O \tag{1}$$

$$NH_3 + O_2 \rightarrow NO_x + H_2O \tag{2}$$

The waste gas of combustion, therefore, includes the $NH_3$ and $NO_x$ thus formed. In effecting the combustive disposal of the effluent, therefore, ammonium ions must be removed before it is subjected to disposal. By proper selection of the operating conditions of the furnace alone, it is difficult to lower successfully the undecomposed $NH_3$ and $NO_x$ contents of the waste gas of combustion to levels tolerable for release into the air, say to less than 100 ppm respectively. The $SO_4^{--}$ which is present in the effluent is thermally decomposed into sulfur dioxide ($SO_2$) when it is heated to a temperature of 800° C or over. At such a high temperature, an equilibrium indicated by the formula (3) below is established between the sulfur oxides $SO_2$ and $SO_3$.

$$SO_3 \rightleftarrows SO_2 + \tfrac{1}{2} O_2 \tag{3}$$

At temperatures above the level of 800° C, the equilibrium expressed by the formula (3) above shifts substantially in the direction of the righthand member of the formula. The waste gas of combustion which consequently contains the produced $SO_2$ naturally causes air pollution unless the $SO_2$ content thereof is lowered to a sufficiently tolerable level such as, for example, to less than 100 ppm by volume before the gas is released into the air. In order that such occurrence of $SO_2$ within the roaster may be prevented in the combustive disposal of the effluent, therefore, it is necessary that the $SO_4^{--}$ be removed prior to the combustion of the effluent or it be properly treated to have the $SO_4^{--}$ converted to an inorganic salt incapable of producing $SO_2$ through thermal decomposition upon exposure to an elevated temperature.

SUMMARY OF THE INVENTION

It is, therefore, an object of the present invention to provide a novel method for the combustive disposal of a waste water containing ammonium ions, sulfate ions and organic substances, which method permits the disposal to be carried out without air pollution.

This object and the other objects of the present invention will become apparent from the description that follows.

It has now been discovered that the waste gas resulting from the combustion of the waste water does not cause air pollution when the combustion of the waste water is carried out by a treatment which includes adding to the waste water either calcium hydroxide ($Ca(OH)_2$) or calcium oxide (CaO) to fix the $SO_4^{--}$ ions present in the waste water in the form of calcium sulfate and at the same time causing the $NH_4^+$ ions present therein to be liberated in the form of $NH_3$ in the waste and recovering the produced $NH_3$ from the waste water.

According to the present invention, there is provided a three-step method for the disposal of a waste water containing ammonium ions, sulfate ions and organic substances, which method includes, as a first step, adding calcium hydroxide or calcium oxide to the waste thereby fixing and precipitating the sulfate ions present in the waste water in the form of calcium sulfate and at the same time causing the ammonium ions present in the waste water to be liberated in the form of ammonia in the waste water. In the second step heated air is brought into contact with the waste water thus treated to distill out and recover substantially all of the ammonia and a part of the water present in the waste water and at the same time permitting the resultant evaporation residue to acquire a pH value of about 8.5 or over. In the third step the evaporation residue produced in the second step is introduced into a combustion furnace for burning at temperatures in the range of from 700° C to 1000° C.

BRIEF EXPLANATION OF THE DRAWING

The accompanying drawing is a flow sheet illustrating one preferred embodiment of this invention.

DETAILED DESCRIPTION OF THE INVENTION

In the present invention calcium hydroxide or calcium oxide is added to the waste water containing ammonium ions, sulfate ions and organic substances before the waste water is subjected to disposal by combustion. Since the calcium hydroxide, $Ca(OH)_2$, has the nature of an involatile alkali (relatively strong), the $NH_4^+$ ions contained in the waste water are converted by the reaction of the formula of the formula (4) shown below into $NH_3$ and are liberated in that form. At the same time, the $SO_4^{--}$ ions present in the waste water are combined with $Ca^{++}$ ions as indicated by the reaction formula (5) below and are consequently precipitated in the form of $CaSO_4$. This reaction product, $CaSO_4$, is so stable that even when subject to a relatively high temperature within the furnace, it will not decompose to give rise to $SO_2$.

$$Ca(OH)_2 \rightarrow Ca^{++} + 2OH^-$$

$$NH_4^+ + OH^- \rightarrow NH_3 + H_2O \quad (4)$$

$$Ca(OH)_2 + SO_4^{--} \rightarrow CaSO_4 + 2OH^- \quad (5)$$

A typical embodiment of the present invention will be described below with reference to the accompanying drawing which represents the disposal of an effluent from the process for AN production. The effluent issuing from the AN process has a composition like the one indicated below, for example.

| | | |
|---|---|---|
| $(NH_4)_2SO_4$ | 13.5% by weight | |
| Other $NH_4^+$ | 1.2% by weight | 25.5% by weight |
| Cyanide ion ($CN^-$) | 1.5% by weight | |
| Organic substances | 9.3% by weight | |
| Water | Balance | 74.5% by weight |

The raw effluent of which the organic substances have a heat of combustion of more than about 6000 Kcal/kg is forwarded by a pump 3 to a mixing tank 2, in which the effluent is continuously mixed with finely pulverized calcium hydroxide ($Ca(OH)_2$) or calcium oxide (CaO) continuously fed through a lime hopper 1. A part of the liberated $NH_3$ vaporizes from the mixing tank 2 and passes through an ammonia vent 18. The slurry which contains calcium sulfate, $CaSO_4$, and excess lime, $Ca(OH)_2$, in the form of precipitates is forwarded to one end of a hot air contact type evaporator 4. Into this evaporator 4, a hot gas formed by the method described below is introduced cocurrently with the slurry and the hot air consequently produced serves the dual purpose of heating the slurry and evaporating the water contained in the slurry. By this treatment, the free ammonia, $NH_3$, contained in the slurry is vaporized with the water and the resultant $NH_3$ vapor is entrained by the hot gas which is discharged through the other end of the evaporator 4. The effluent concentrated within the evaporator 4, is discharged therefrom in the form of slurry or as a dry evaporation residue. The amount of $Ca(OH)_2$ introduced into the mixing tank 2 for mixing with the effluent is so adjusted that in the course of evaporation and at the stage when most of ammonia contained in the effluent is driven off, the pH value of the drying effluent which still contains some water to permit measurement by a pH meter or pH test paper is not less than 8.5, preferably 10.0 and more preferably 11.0. More specifically, $Ca(OH)_2$ is introduced in a sufficient amount into the mixing tank 2 so as to keep the pH value of the evaporation residue in the alkaline range by an excess of $Ca(OH)_2$ remaining in the evaporation residue after the sulfate radicals or other acid radicals have been converted to calcium salts. The amount of $Ca(OH)_2$ to be introduced into the mixing tank 2 can be calculated or experimentally determined by determining the composition of the effluent and the final moisture content of the effluent. In practical operation, the amount of $Ca(OH)_2$ or CaO added should be varied depending on the type of the waste water and operating conditions. The proper amount can be determined in advance by experiments or by measuring the pH value of the evaporation residue sampled at a proper point in the evaporator or otherwise read on a pH meter provided on the evaporator, in relation to data for actual alkali supply. As a result, nearly all the $NH_4^+$ ions are converted into $NH_3$ and only a very small fraction remains in its original form. The remaining amount of $NH_3$ can freely be decreased to a low level by supplying the hot gas at a sufficient temperature and volume. At a pH value in the range mentioned above, the $CN^-$ ions present in the raw effluent is deprived of its volatility so that the greater part of this ion remains in the evaporation residue. The evaporation residue containing organic substances, $CaSO_4$ and excess $Ca(OH)_2$ is transferred in its unaltered form into a combustion furnace 5 for disposal.

The combustion furnace 5 is an ordinary fludized-bed type. The concentrated effluent (evaporation residue) from the evaporator 4 is introduced downwardly through the top of the furnace 5 to a fluidized bed formed of particles of an inert medium (such as, for example, quartz). At the same time, an auxiliary fuel, if required for heat balance, is supplied through a fuel pipe 6 provided on the side of the furnace 5. The air which is required to effect the combustion of the evaporation residue and to maintain the fluidization under required conditions within the combustion furnace 5 is fed by a combustion air blower 8 through a support grid 7. The ask from combustion, which consists mainly of $CaSO_4$ and CaO, is discharged by an ordinary method out of the combustion furnace 5 and separately disposed of as ash 9. The factors which affect the results of combustion within the combustion furnace 5 are the temperature of the furnace and the residual oxygen concentration within the waste gas discharged from the combustion furnace 5. In order that the organic substances of the effluent may be substantially completely burned in the combustion furnace 5, it is necessary that the temperature of the fluidized bed be be at least 700° C, preferably not lower than 800° C, and the residual oxygen concentration in the waste gas be at least 1.5 percent by volume, preferably not less than 3.0 percent by volume. Generally only for the purpose of ensuring perfect combustion of the organic substances, it is advantageous to fix this temperature as high as permissible. In the present invention, however, the material received in the combustion furnace 5 contains $CaSO_4$ in a considerably high concentration. To prevent decomposition of this compound, therefore, it is necessary that the temperature be prevented from rising above 1000° C. Thus, the tolerable temperature range is relatively narrow. Use of a combustion furnace of a fluidized-bed type in such a situation may be advantageous to enable the effluent to be stably burned under a prescribed set of conditions.

The hot gas produced within the combustion furnace 5 is treated for removal of relatively coarse particles of ash by inner cyclone 20 and then is passed through a heat exchanger 10 to release its heat to the air from an air blower 12. It is now almost completely freed of the fine entrained particles by means of a bag filter 13 and finally discharged from the pipe 11 into the atmosphere. The hot air which contains the heat recovered by means of the heat exchanger 10 is led to the evaporator 4 as described above and utilized for evaporation of the water and ammonia components of the effluent. The hot gas which is discharged out of the evaporator 4 contains a fair fraction of the water and most of the ammonia contained originally in the effluent. At the outlet of the evaporator 4, the temperature of the hot gas has already fallen below 200° C. This hot gas is passed through a dehumidifier 14, wherein it is cooled with the cool liquid being circulated through the circulation pump 16 and the condenser 15, with the result that part of the water contained in the hot as is condensed. The resultant condensate absorbs ammonia to saturation and the ammonia-saturated condensate is properly discharged through the purge line 17. Consequently, air containing ammonia is obtained from the top of the dehumidifier 14. This air is combined with the ammonia from the ammonia vent 18 and forwarded via a pipe 19 to the reaction unit for propylene ammoxidation to be used as the source of ammonia and of part of the air for oxidation.

From the foregoing description, the characteristics and effects of the present invention may be summarized as follows:

1. Emission of $SO_2$ is entirely prevented, because by adding either $Ca(OH)_2$ or CaO to the raw effluent, the $SO_4^{--}$ ions are substantially converted into $CaSO_4$ and fixed, and possible emission of $SO_2$ due to unprecipitated $SO_4^{--}$ in the evaporation residue is also suppressed, since more than an equivalent amount of $Ca^{++}$ ions are present, and also because the combustion temperature is maintained at no higher than 1000° C.

2. The $NH_4^+$ ions present in the raw effluent are liberated as indicated by formula (4) in the form of $NH_3$ by addition to the raw effluent of an ample amount of $Ca(OH)_2$ or CaO as an inexpensive alkali. The ammonia which exists in the form of free $NH_3$ within the effluent is removed in conjunction with water by stripping from the effluent. By the stripping, this ammonia is substantially completely recovered from the effluent in a usable form. To permit complete recovery of the ammonia, the pH value of the evaporation residue is required to be at least 8.5. Ammonia is stripped, as previously described, by blowing hot air into the effluent. Stripping can also be accomplished by blowing steam into the effluent or by indirectly heating the effluent so as to distill off the ammonia in conjunction with water vapor.

3. The heat recovered from the waste gas emanating from the combustion furnace is effectively used to obtain substantially complete recovery of ammonia from the effluent and to vaporize the water component of the effluent to the fullest extent. The resulting slurry, sludge or dry matter is led to the combustion furnace, wherein the organic substances entrained by the effluent can be burned without an auxiliary fuel or by using a small amount of auxiliary fuel.

4. The material introduced and burned in the combustion furnace, as circumstances demand, can be thoroughly stripped of the ammonia component. When this material is burnt under the aforementioned conditions of temperature and residual oxygen concentration, the concentrations of the residual $NH_3$ and the $NO_x$ in the waste gas resulting from the combustion can be lowered below their respective tolerable levels.

5. The sensible heat retained by the hot waste gas discharged from the combustion furnace can be utilized for preheating the air by virtue of the heat exchanger. The heat thus recovered can make up partially or wholly the heat required for the removal of the water component and ammonia component from the effluent to their respectively specified levels.

EXAMPLE

By the procedure illustrated in the accompanying drawing, an effluent of the following description from an acrylonitrile production process was subjected to an experiment including neutralization with lime, concentration and combustion as described below.

| Specific gravity | - 1.08 | |
|---|---|---|
| pH | - 5.5 | |
| Heat of combustion | - 6600 Kcal/kg of the contained organic substances | |
| Analyses | - $(NH_4)_2SO_4$ | 8.95% by weight |
| | Other $NH_4^+$ | 1.84% by weight |
| | $CN^-$ | 0.11% by weight |
| | Organic substances | 12.78% by weight |
| | Water content | 76.32% by weight |

The raw effluent was delivered directly to the mixing tank 2, wherein it was neutralized by using as the lime 71.4 kg as $Ca(OH)_2$, per 1000 kg of the raw effluent, of industrial grade slaked lime. The slurry consequently obtained was forwarded in its unaltered form, i.e. containing the formed $CaSO_4$ and other educed substances, to the evaporator 4 and concentrated therein. The hot air heat source was heated to elevated temperatures of from 600° to 650° C in the heat exchanger and used for the evaporation of the slurry. In this manner, the solids concentration of the slurry was increased from about 24 percent by weight to about 38 percent by weight and, at the same time, up to about 93 percent of the ammonia component was released and diffused into the air.

At the outlet of the evaporator of the direct-contact type, the temperature of the waste was the approximate range of from 160° to 180° C and that of the concentrated slurry in the approximate range of from 90° to 95° C. The pH of the slurry was not less than 10.0.

As the waste gas containing the evaporated water component and ammonia component is treated by the combination of the dehumidifier 14, the liquid circulation pump 16 and the condenser 15, the cooling liquid which is maintained around 140° C condenses not less than 85 percent of the water component in the waste gas only about 15 percent of the ammonia component to pass into the liquid. The remaining portions of the water component and ammonia component remain in the waste gas and are led with air to the main-process reactor, wherein they are utilized for the ammoxidation reaction.

In the meantime, the slurry which has been concentrated in the evaporator 4 is led in its unaltered form into the fluidized-bed type combustion furnace 5 and burned within a layer of sand particles serving as a fluidized medium at temperatures in the range of from 800° C to 850° C. In the case of a raw effluent having a composition like the one indicated above, the combustion is generally self-supporting except during startup. In the temperature range as mentioned above, formation of $SO_2$ due to the thermal decomposition of $CaSO_4$ present in the effluent occurs to a negligibly small extent. The waste gas, while in the heat exchanger, releases the greater part of its sensible heat to the current of cool air. Fine suspended particles are removed by the bag filter 13 and then the waste gas is discharged through the smoke pipe 11 into the ambient air.

The air to the combustion furnace 5 is supplied at a ratio 20 to 30 percent in excess to ensure perfect combustion of the organic substances in the raw effluent. Consequently, the ash resulting from the combustion is a white powder consisting preponderantly of $CaSO_4$ and $CaO$. The ash, therefore, can be discarded directly or utilized in its unmodified form for the reclamation of land, for example.

What is claimed is:

1. A method for the disposal of a waste water containing ammonium ions, sulfate ions, and organic substances which comprises:
   a. adding sufficient calcium hydroxide or calcium oxide to said waste water for reaction with the sulfate ions present in said waste water to form a precipitate of calcium sulfate and thereby liberating the ammonium ions in the form of ammonia in said waste water; then
   b. contacting heated air with the waste water to distill off substantially all of said ammonia and a part of the water present in said waste water as a vapor and at the same time to produce an evaporation residue having a pH value of about 8.5 or more; and then
   c. introducing said evaporation residue into a combustion furnace and burning said residue at a temperature in the range of from 700° C to 1000° C.

2. The method according to claim 1, wherein said combustion furnace is a fluidized-bed type combustion furnace.

3. The method according to claim 1, wherein the air contacted with the waste water to distill off ammonia is heated by the waste gas discharged from said combustion furnace.

4. The method according to claim 1, wherein said temperature in said furnace is in the range of from 800° C to 1000° C.

5. The process of claim 1 wherein the temperature of said heated air is 600° to 650° C.

* * * * *